(12) United States Patent
Wang et al.

(10) Patent No.: US 7,111,103 B2
(45) Date of Patent: Sep. 19, 2006

(54) METHOD AND APPARATUS FOR SYSTEM MANAGEMENT APPLICATIONS USING A LOCAL CONTROLLER

(75) Inventors: Jennifer C. Wang, Tempe, AZ (US); Aniruddha P. Joshi, Chandler, AZ (US); Peter R. Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 10/104,341

(22) Filed: Mar. 22, 2002

(65) Prior Publication Data

US 2003/0182489 A1 Sep. 25, 2003

(51) Int. Cl.
*G06F 13/36* (2006.01)
*G06F 13/14* (2006.01)

(52) U.S. Cl. .................. 710/306; 710/305; 710/310
(58) Field of Classification Search ............... 710/305, 710/15; 709/100, 310
See application file for complete search history.

(56) References Cited

U.S. PATENT DOCUMENTS

| | | | | |
|---|---|---|---|---|
| 5,499,346 | A * | 3/1996 | Amini et al. | 710/311 |
| 5,857,085 | A * | 1/1999 | Zhang et al. | 710/305 |
| 6,145,048 | A * | 11/2000 | Klein | 710/264 |
| 6,199,134 | B1 * | 3/2001 | Deschepper et al. | 710/311 |
| 6,272,642 | B1 * | 8/2001 | Pole et al. | 713/300 |
| 6,360,327 | B1 * | 3/2002 | Hobson | 713/300 |
| 6,457,091 | B1 * | 9/2002 | Lange et al. | 710/314 |
| 6,704,877 | B1 * | 3/2004 | Cline et al. | 713/320 |
| 6,834,301 | B1 * | 12/2004 | Hanchett | 709/223 |
| 6,839,793 | B1 * | 1/2005 | Ragland | 710/316 |
| 7,003,607 | B1 * | 2/2006 | Gulick | 710/110 |
| 7,010,630 | B1 * | 3/2006 | Pagan | 710/100 |
| 2002/0124197 | A1 * | 9/2002 | Atkinson | 713/322 |

FOREIGN PATENT DOCUMENTS

JP  P2001-216390  * 2/2000

OTHER PUBLICATIONS

Morris Mano, "Computer System Architecture", 1982, Prentice-Hall, Inc., 2nd Ed., pp. 59-61.*
Jagan Jayaraj, Pravin Rajendran, and Thiruvel Thirumoolam, "Shadow Register File Architecture: A Mechanism to Reduce Context Switch Latency", College of Engineering Guindy, Anna University, Chennai, India.*
PCI Special Interest Group, "PCI-to-PCI Bridge Architecture Specification", 1998, PCI Special Interest Group, Rev. 1.1, pp. 11-13 and 19-30.*
Intel 440BX AGPset: 82443BX Host Bridge/Controller Specification Update, Intel Document No. 290639-006, Jan. 2001, pp. 1-48.
Intel 82371AB PIIX4, Intel 82371EB PIIX4E, Intel 82371MB PIIX4M Specification Update, Intel Document No. 297738-017, Jan. 2002, pp. 1-55.

* cited by examiner

*Primary Examiner*—John R. Cottingham
*Assistant Examiner*—Justin King
(74) *Attorney, Agent, or Firm*—Kacvinsky LLC (57) ABSTRACT

A system to monitor performance of a computing device includes a first bridge to interface with a first set of devices, and a second bridge to interface with a second set of devices. Configuration registers store configuration data associated with the second set of devices, and are accessible through the second bridge. A hub interface allows data to transfer downstream from the first bridge to the second bridge, and allows data to transfer upstream from the second bridge to the first bridge. A controller, external to the first and second bridges, accesses the configuration registers via the second bridge. A logic device allows the second bridge to send data to, and receive data from, the controller.

30 Claims, 8 Drawing Sheets

METHOD AND APPARATUS FOR SYSTEM MANAGEMENT APPLICATIONS USING A LOCAL CONTROLLER

BACKGROUND OF THE INVENTION

1. Field of the Invention

This invention relates to the field of system management, and, more specifically, to a system, method, and apparatus for allowing a System Management (SM) controller to access configuration registers through an Input/Output Controller Hub (ICH), the "South Bridge," without going through a Memory Controller Hub (MCH), the "North Bridge."

2. Background of the Invention

Figure 1:
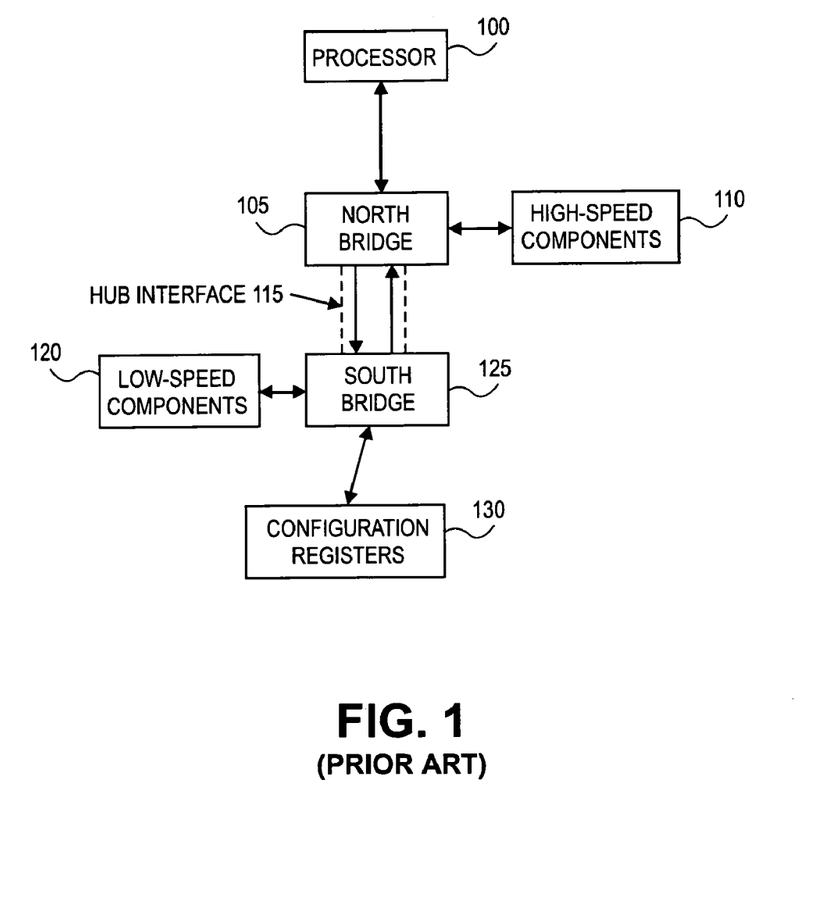
FIG. 1 illustrates a computer architecture as used in the prior art.

The architecture of current computer systems typically includes a Memory Controller Hub (MCH), also known as the "North Bridge," and an Input/Output Controller Hub (ICH), also known as the "South Bridge," connected by a hub interface. FIG. 1 illustrates a typical computer architecture according to the prior art. As shown, a processor 100 is coupled to the North Bridge 105. The North Bridge 105 is the controller for a bus that interfaces between the processor 100 and high speed components 110, such as graphics and memory devices.

The South Bridge 125 is the controller for low-speed components 120, such as hard disk drives, Peripheral Component Interface (PCI) devices, a Universal Serial Bus (USB), a Flash Basic Input Output System (BIOS), Ethernet devices, and Communications and Networking Riser (CNR) devices.

The North Bridge 105 transfers and receives data with the South Bridge 125 via a bi-directional hub interface 115. Configuration registers 130 store configuration data for devices connected to the South Bridge 125. For example, the configuration registers 130 can be used to hold information, such as settings for the hard disk drive (e.g., the amount of available space of the disk, the Interrupt Request Queue (IRQ) line used by the disk drive, the speed of the disk drive, etc.).

System Management (SM) applications can be used to monitor the status of several computer systems. Such applications often need to access the configuration registers 130 to determine the configuration settings for the devices on the South Bridge 125. In current systems, the configuration registers 130 are typically accessed only through the North Bridge 105, which then communicates with the configuration registers 130 via the South Bridge 125. Such systems are inefficient because the System Management application cannot directly access the South Bridge 125 (i.e., the South Bridge 125 is accessed only indirectly, through the North Bridge 105). Because the North Bridge 105 is used to access the configuration registers 130 via the South Bridge 125, a separate application program, being executed and using the North Bridge 105, has to be interrupted to transfer the information extracted from the configuration registers 130 to the System Management application. It is inefficient to interrupt an application program to send data to the System Management application.

There are some current systems that allow system management to be done by peripherals acting as PCI masters. However, these solutions require an external PCI bus and the capability for peer-to-peer transactions. These solutions impact PCI traffic and have very limited capability due to the many system level issues involved in allowing an external PCI master to access the relevant address spaces. In other words, an add-in card can wreak havoc on the system and create security issues if it accesses these regions.

Prior systems are therefore inferior because the configuration registers cannot be read by an external device directly connected to the South Bridge 125 (i.e. not through the use of the North Bridge 105) without the additional of an external PCI bus.

DETAILED DESCRIPTION

An embodiment of the present invention allows a System Management (SM) controller, external to a computer system, to access configuration registers through the Input/Output Controller Hub (ICH), also known as the "South Bridge," without first going through a Memory Controller Hub (MCH), also know as the "North Bridge." Also, the embodiment may utilize an internal Peripheral Component Interface (PCI) bus to access configuration registers associated with PCI devices, instead of utilizing an external PCI bus.

Figure 2:
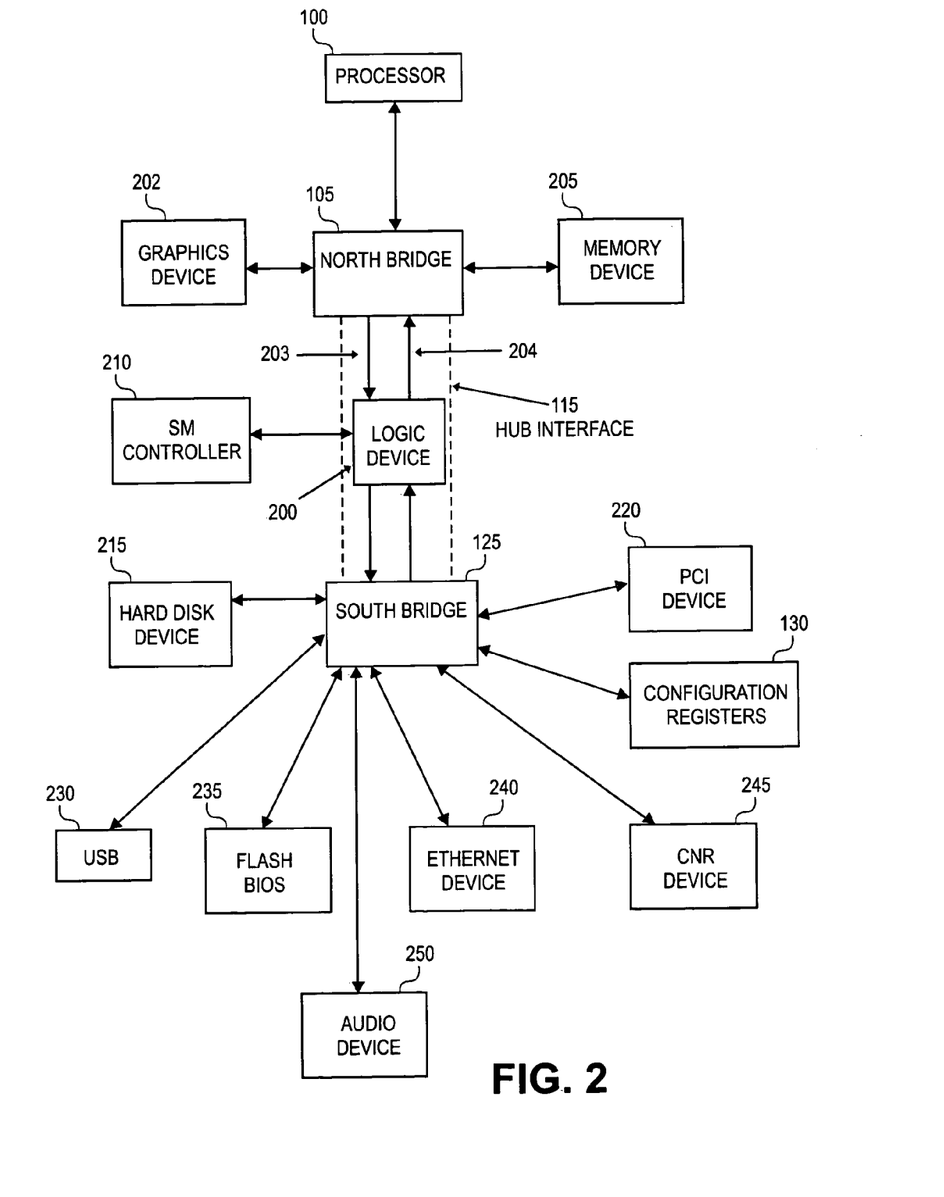
FIG. 2 illustrates a computer architecture used to allow a System Management (SM) controller to directly access a South Bridge according to an embodiment of the invention.

FIG. 2 illustrates a computer architecture used to allow a System Management (SM) controller 210 to directly access a South Bridge 125 according to an embodiment of the invention. The South Bridge 125 may be an Intel 82371AB PIIX4, specification published January 2002, for example. The South Bridge 125 may be a controller for hard drives such as hard disk device 215, and lower-speed ports such as a PCI device 220, a Universal Serial Bus (USB) 230, a Flash Basic Input Output System (BIOS) 235, an Ethernet device 240, a Communications and Networking Riser (CNR) device 245, and an audio device 250, for example. In other embodiments, the South Bridge 125 may have a different name or may alternatively be the controller for higher-speed ports. The set-up and location of the South Bridge 125 is system-specific.

The South Bridge 125 communicates with a North Bridge 105. The North Bridge 105 may be an Intel 440BX AGPset: 82443BX Host Bridge/Controller, specification published January 2001, for example. The North Bridge 105 may be a controller for a bus that interfaces between a processor 100 and high speed components, such as a graphics device 202 and a memory device 205. A direct data path exists between the processor 100 and the North Bridge 105.

It may be necessary, from time to time, to check the setting for devices accessible via the South Bridge 125. The settings for the devices accessible via the South Bridge 125 may be stored in configuration registers 130. The configuration registers 130 may be accessible via the South Bridge 125. The configuration registers 130 may be located within a memory such as a Random Access Memory (RAM). In an embodiment of the invention, the configuration settings for all of the devices accessible via the South Bridge 125 are stored in a location separate from the respective devices (i.e., 215, 220, 230, 235, 240, 245, and 250), as illustrated in FIG. 2. In other embodiments, the configuration settings may be stored in configuration registers 130 located in each of the devices accessible via the South Bridge 125 (i.e., 215, 220, 230, 235, 240, 245, and 250).

If a user of a computer having the architecture shown in FIG. 2 desires to check the amount of empty space on the hard disk drive 215, the user may, for example, use a program to cause the processor 100 to send a signal to the North Bridge 105, which may then send a signal to the South Bridge 125 via a downstream data path 203. The South Bridge 125 may then access the configuration registers 130, read the configuration settings for the hard disk device 215, and transmit that information back to the North Bridge 105 via the upstream data path 204, which may then communicate the data to the processor 100. Both the downstream data path 203 and the upstream data path 204 are contained within a bi-directional hub interface 115. The bi-directional hub interface 115 provides the pathway through which data flows between the North Bridge 105 and the South Bridge 125. An embodiment of the invention may also include a logic device 200 within the bidirectional hub interface 115, as explained in further detail below.

An embodiment of the invention may be utilized in a computer system having a plurality of computers (e.g., a bank of "10" computers). In such networks of computers, the entire network may run smoothly if a single System Management (SM) controller 210, or a set of SM controllers 210 monitor the configuration settings of the devices in each of a plurality of computers having a similar, or the same, architecture as shown in FIG. 2. For example, there may be a single SM controller 210 that monitors the configuration settings of the "10" computers. The SM controller 210 may then access the configuration registers 130 in each of the computers and monitor the devices whose settings are stored in the configuration registers 130. In such an embodiment, it is not efficient for the SM controller 210 to have to access the configuration registers 130 indirectly through the processor 100 or the North Bridge 105 because an application that is to be executed that utilizes the processor 100 and the North Bridge 105 would have to be interrupted. Therefore, it is more efficient for the SM controller 210 to bypass the North Bridge 105 and the processor 100 and access the configuration registers 130 via the South Bridge 125. However, the SM controller 210 cannot access the South Bridge 125 at any arbitrary time. In order to access the South Bridge 125, the SM controller 210 may insert data into the downstream path 203 to the South Bridge 125. However, the SM controller 210 cannot insert data into the downstream path 203 without causing an error if data is already being sent in the downstream path 203 by the North Bridge 105. The logic device 200 is utilized to insert data, also known as "cycles," into the downstream data path 203 when that path is free (i.e., when the North Bridge 105 is not currently transmitting data over it).

The data is then received by the South Bridge 125, which accesses the configuration registers 130, and copies the requested data. The South Bridge 125 then sends the data, or cycles, out via its upstream data path 204. A single path is generally used to transmit the data via the hub interface 115 to the North Bridge 105. Therefore, data destined for the SM controller 210 or for the North Bridge 105 is sent on the same upstream data path 204. Data destined for the SM controller 210 is sent from the South Bridge 125 along with data informing the system that the data is meant for the SM controller 210. The data is received by the logic device 200, which determines whether the data is meant for the North Bridge 105 or the SM controller 210, and then routes the data accordingly.

In other embodiments, a controller or device other than the SM controller 210 may be used to contact the South Bridge 125. In additional embodiments, more than one controller or device other than the North Bridge 125 may access the South Bridge 125. Also, although the logic device 200 is shown as being part of the hub interface 115, other embodiments may include a logic device 200 that is separate from the hub interface 115. Other embodiments may utilize more than one logic device 200. Additional embodiments may utilize a logic device 200, or multiple logic devices 200, that physically reside within the South Bridge 125.

Figure 3:
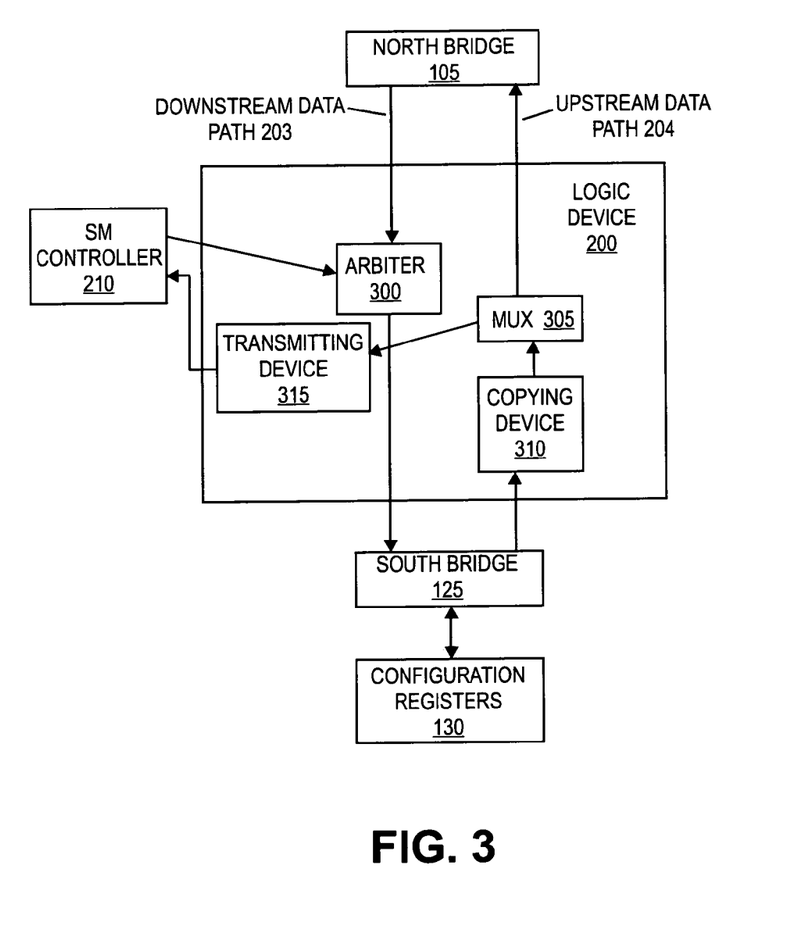
FIG. 3 illustrates a logic device allowing an external System Management (SM) controller to access a South Bridge according to an embodiment of the invention.

FIG. 3 illustrates a logic device 200 that allows an external SM controller 210 to access the South Bridge 125 according to an embodiment of the invention. As shown, the logic device 200 may include an arbiter 300 to transmit the data, or cycles from the SM controller 210, onto the downstream data path 203. The arbiter 300 may transmit the data into the downstream data path 203 based upon timing and a predetermined priority. For example, data from the SM controller 210 may have a lower priority than data from the North Bridge 105. Therefore, if data is being sent from the North Bridge 105 to the South Bridge 125 via the downstream data path 203, when data sent from the SM controller 210 is received by the arbiter 300, the arbiter 300 may hold the data from the SM controller 210 until the North Bridge 105 has finished sending data to the South Bridge 125. The arbiter 300 therefore serves as a "traffic cop" allowing the more important data (i.e., the data with the higher priority) to normally flow to the South Bridge 125, and only sending the less important data (i.e., the data with the lower priority) when the higher priority data is not currently being sent along the desired path.

Once data from the SM controller 210 has been received by the South Bridge 125, the configuration registers 130 may be accessed, and the copied data may be sent back to the SM controller 210. A copying device 310 may be utilized to copy the information from the configuration registers so it can be sent to the SM controller 210. The copying device 310 may be located within the logic device. In other embodiments, the copying device 310 may be located within the South Bridge 125. The data may be sent from the South Bridge 125 to a multiplexor (MUX) 305 via the upstream data path 204. A portion of the data may contain information concerning the destination of the data. The MUX 305 may include a function of routing the data to its specified destination. Therefore, the data, a portion of which indicates that the SM controller 210 is the final destination, would be routed to the SM controller 210. A transmitting device 315 may be utilized to send data to the SM controller 210. In an embodiment, the transmitting device 315 may be separate from the MUX 305. In other embodiments, the transmitting device may be located within the MUX 305. Data associated with the North Bridge 105 may be routed to the North Bridge 105. In other embodiments, the logic device 200 may include suitable components other than the arbiter 300 and the MUX 305.

Figure 4:
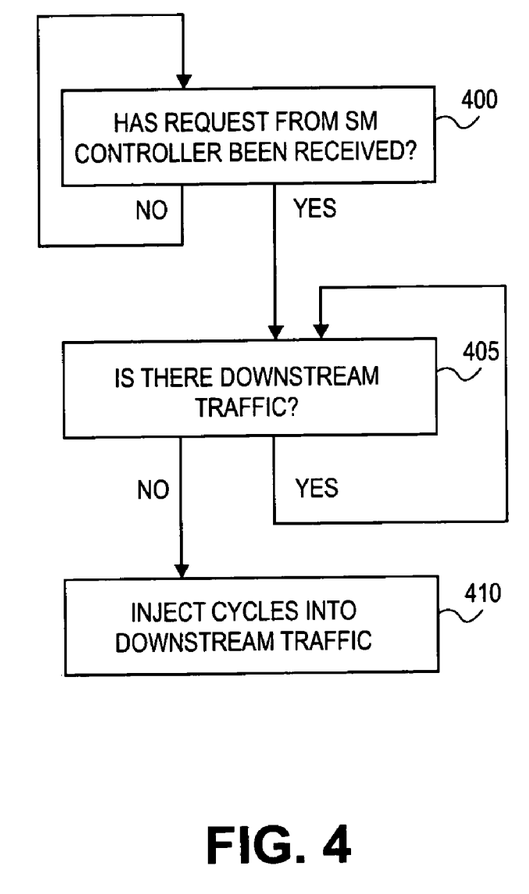
FIG. 4 illustrates a process by which an arbiter sends data from a System Management (SM) controller to the South Bridge according to an embodiment of the invention.

FIG. 4 illustrates a process by which the arbiter 300 sends data from the SM controller 210 to the South Bridge 125 according to an embodiment of the invention. First, the arbiter 300 determines 400 whether a configuration setting request has been received. If a request has been received, processing proceeds to step 405. Otherwise, the processing stays at step 400 until a request has been received. If no request has been received, the arbiter 300 will allow all data sent from the North Bridge 105 to the South Bridge 125, via the downstream data path 203, to flow unimpeded. Next, at step 405, the arbiter 300 determines whether there is currently any downstream traffic. If there is, processing stays at step 405 until there is no longer any downstream traffic. If there is no current downstream traffic, then the data request from the SM controller 210, or the "cycles," are transmitted 410 into the downstream traffic on the downstream data path 203. In other embodiments, a controller other than the SM controller 210 may be used that has a greater priority than the North Bridge 105.

Figure 5:
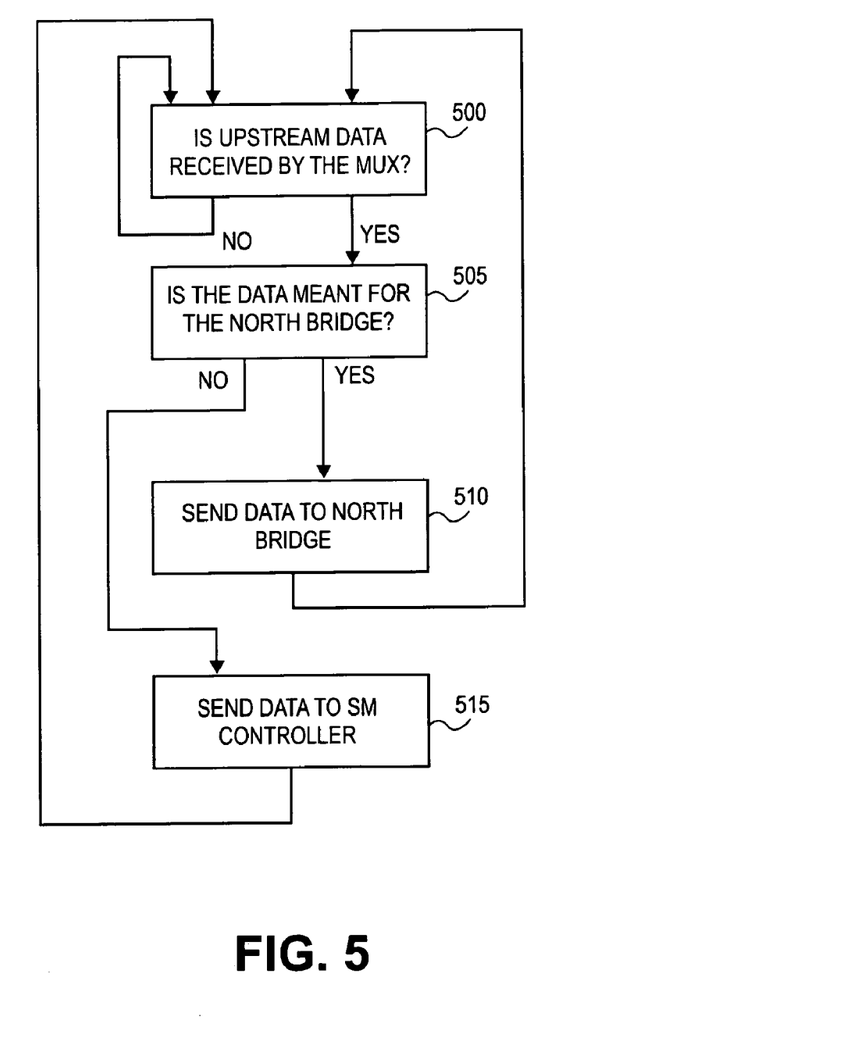
FIG. 5 illustrates a process by which a multiplexor routes data to a System Management (SM) controller according to an embodiment of the invention.

FIG. 5 illustrates a process by which the MUX 305 routes data to the SM controller 210 according to an embodiment of the present invention. First, the processing determines 500 whether there is any upstream data that has been received by the MUX 305. If there has not been, processing remains at step 500. If there has been, processing continues to step 505 where the processing determines whether the data is meant for the North Bridge 105. If it is, then the data is sent 510 to the North Bridge 105 and processing returns to step 500. However, if the data is not meant for the North Bridge 105, then the data is sent 515 to the SM controller 210, and processing returns to step 500.

Figure 6:
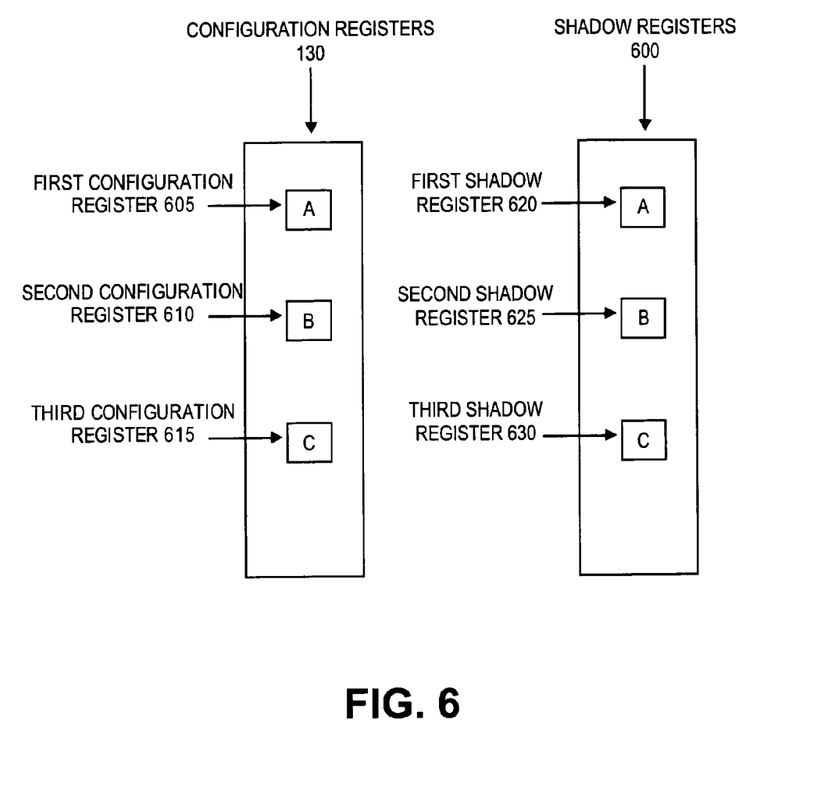
FIG. 6 illustrates shadow registers utilized to store a copy of data stored in configuration registers according to an embodiment of the invention.

FIG. 6 illustrates shadow registers 600 that are utilized to store a copy of data stored in the configuration registers 130 according to an embodiment of the invention. The shadow registers 600 may be located in a different location in memory than the configuration registers 130, or in a different memory device. Shadow registers 600 may be suitable in a situation where the configuration registers 130 are of a "read-and-clear" type. "Read-and-clear" registers are automatically cleared after data is copied from them. Because the SM controller 205 may be used simply to monitor the performance or settings of a computer system, errors may occur if the configuration registers 130 are cleared when read by the South Bridge 125, pursuant to a request by the SM controller 210. Therefore, when the settings data is originally stored in the configurations registers 130, copies of that data may be stored in the shadow registers 600, which may contain an exact copy of the data in the configuration registers 130. The shadow registers 600 may then be read to retrieve the configuration settings. The shadow registers 600 may include registers that are not of a "read-and-clear" type.

As shown in FIG. 6, the configuration registers 130 include three registers: first configuration register 605 (holds the data "A"), second configuration register 610 (holds the data "B"), and third configuration register 615 (holds the data "C"). The shadow registers 600 include first shadow register 620 (holds the data "A"), second shadow register 625 (holds the data "B"), and third shadow register 630 (holds the data "C").

Figure 7:
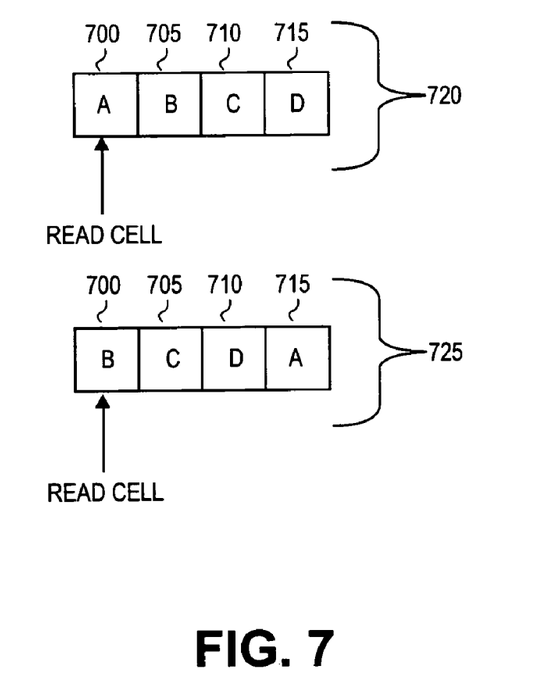
FIG. 7 illustrates memory cells utilized to store data in configuration registersaccording to an embodiment of the invention.

FIG. 7 illustrates memory cells 700, 705, 710, 715 utilized to store data in the configuration registers 130 according to an embodiment of the invention. In a situation where only a limited number of memory cells may be read, or only one memory cell may be read, the data must be shifted to a readable cell to be read. In the example of FIG. 7, only the first memory cell 700 is readable. First, memory cell 700 is read in its original state 720. Next, data in all of the registers is shifted as shown in the illustration 725 of the memory cells and the next data is read (i.e., "B") from the first memory cell 700. In the example, all of the data is shifted to a memory cell to the left, except for memory cell 700, whose data was shifted to the fourth memory cell 715, located on its extreme right. A similar shifting process is undertaken until all of the relevant data has been read from the memory cells 700, 705, 710, and 715. The entire shifting process is known as a "scan chain" access.

Figure 8:
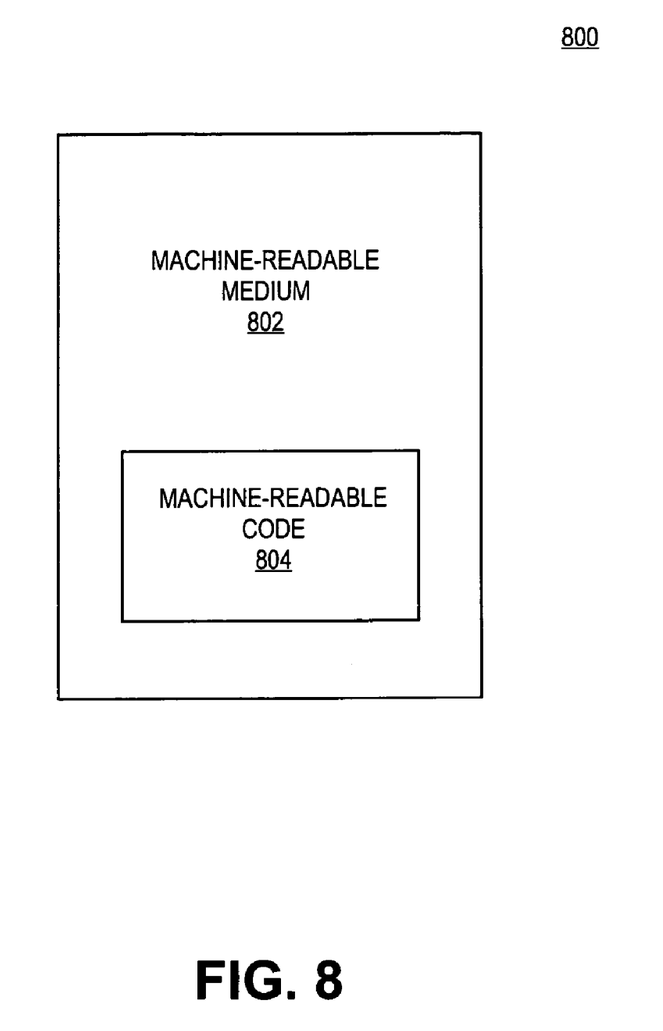
FIG. 8 illustrates a machine code storage device according to one embodiment of the invention.

FIG. 8 illustrates a machine code storage device according to one embodiment of the invention. FIG. 8 illustrates a machine code storage device 800. Machine code storage device 800 may comprise a machine-readable medium 802 storing machine-readable code 804. The embodiments are not limited in this context.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system to monitor performance of a computing device, comprising:
   a first bridge to interface with a first set of devices;
   a second bridge to interface with a second set of devices, the second bridge to communicate with the first bridge via a downstream data path;
   configuration registers to store configuration data associated with the second set of devices, wherein the configuration registers are accessible through the second bridge;
   a hub interface to allow data to transfer downstream from the first bridge to the second bridge, and to allow data to transfer upstream from the second bridge to the first bridge;
   a controller, external to each of the first bridge and the second bridge, to access the configuration registers via the second bridge, the controller coupled to the downstream data path to insert data into the downstream data path; and
   a logic device located between the first and second bridge to allow the second bridge to send data to, and receive data from, the controller, the logic device to insert the data received from the controller into the downstream data path to the second bridge when the first bridge is not transmitting data over the downstream data path.

2. The system according to claim 1, wherein the first bridge is a North Bridge.

3. The system according to claim 1, wherein the second bridge is a South Bridge.

4. The system according to claim 1, wherein the second set of devices includes a Universal Serial Bus ("USB").

5. The system according to claim 1, wherein the logic device includes an arbiter to transmit data downstream to the second bridge.

6. The system according to claim 1, wherein the logic device includes a detection device to detect data to be sent to the controller upstream from the second bridge.

7. The system according to claim 6, wherein the logic device includes a transmitting device to send the detected data to the controller.

8. The system according to claim 6, wherein logic device includes a copying device to copy the detected data from the configuration registers.

9. The system according to claim 6, wherein logic device includes a copying device to copy the detected data from shadow registers.

10. The system according to claim 6, wherein the logic device includes a copying device to copy the detected data from the configuration registers via a scan chain.

11. A method to monitor performance of an electronic system, comprising:
allowing data to flow downstream from a first bridge to a second bridge, wherein the first bridge interfaces with a first set of devices, and the second bridge interfaces with a second set of devices, the second bridge to communicate with the first bridge via a downstream data path;
allowing data to flow upstream from the second bridge to the first bridge;
utilizing configuration registers to store configuration data concerning the second set of devices, wherein the configuration registers are accessible through the second bridge;
allowing a controller, external to each of the first bridge and the second bridge, to access the configuration registers via the second bridge, the controller coupled to the downstream data path to insert data into the downstream data path; and
utilizing a logic device, located between the first and second bridge, to allow the second bridge to send data to, and receive data from, the controller, the logic device to insert the data received from the controller into the downstream data path to the second bridge when the first bridge is not transmitting data over the downstream data path.

12. The method according to claim 11, wherein the first bridge is a North Bridge.

13. The method according to claim 11, wherein the second bridge is a South Bridge.

14. The method according to claim 11, wherein the second set of devices includes a Universal Serial Bus ("USB").

15. The method according to claim 11, further including using an arbiter to inject data into the transfer downstream.

16. The method according to claim 11, further including using the logic device to detect data to be sent to the controller upstream from the second bridge.

17. The method according to claim 16, further including using the logic device to send the detected data to the controller.

18. The method according to claim 16, wherein the detected data includes data copied from the configuration registers.

19. The method according to claim 16, further including copying the detected data from shadow registers.

20. The method according to claim 16, further including copying the detected data from the configuration registers via a scan chain.

21. A machine code storage device, comprising:
a machine-readable medium; and
a machine-readable code, stored on the machine-readable medium, having instructions to allow data to flow downstream from a first bridge to a second bridge, wherein the first bridge is coupled with a first set of devices, and the second bridge is coupled with a second set of devices, the second bridge to communicate with the first bridge via a downstream data path; allow data to flow upstream from the second bridge to the first bridge; utilize configuration registers to store configuration data concerning the second set of electronic devices, wherein the configuration registers are accessible through the second bridge; allow a controller, external to each of the first bridge and the second bridge, to access the configuration registers via the second bridge the controller coupled to the downstream data path to insert data into the downstream data path; and utilize a logic device located between the first and second bridge to allow the second bridge to send data to, and receive data from, the controller, the logic device to insert the data received from the controller into the downstream data oath to the second bridge when the first bridge is not transmitting data over the downstream data path.

22. The machine code storage device of claim 21, wherein the first bridge is a North Bridge.

23. The machine code storage device of claim 21, wherein the second bridge is a South Bridge.

24. The machine code storage device of claim 21, wherein the second set of devices includes a Universal Serial Bus ("USB").

25. The machine code storage device of claim 21, wherein the machine-readable code further includes instructions to use an arbiter to transmit data downstream from the second bridge.

26. The machine code storage device of claim 21, wherein the machine-readable code further includes instructions to detect data to be sent to the controller upstream from the second bridge.

27. The machine code storage device of claim 26, wherein the machine-readable code further includes instructions to send the detected data to the controller.

28. The machine code storage device of claim 26, wherein the detected data includes data copied from the configuration registers.

29. The machine code storage device of claim 26, wherein the machine-readable code further includes instructions to copy the detected data from shadow registers.

30. The machine code storage device of claim 26, wherein the machine-readable program code further includes instructions to copy the detected data from the configuration registers via a scan chain.

* * * * *

UNITED STATES PATENT AND TRADEMARK OFFICE
CERTIFICATE OF CORRECTION

PATENT NO. : 7,111,103 B2 Page 1 of 1
APPLICATION NO. : 10/104341
DATED : September 19, 2006
INVENTOR(S) : Wang et al.

It is certified that error appears in the above-identified patent and that said Letters Patent is hereby corrected as shown below:

On the Title page, in Item (56), under "U.S. Patent Documents", in column 1, line 5, after "6,272,642" delete "B1" and insert -- B2 --, therefor.

On the Title page, in Item (56), under "U.S. Patent Documents", in column 1, line 8, after "6,704,877" delete "B1" and insert -- B2 --, therefor.

In column 8, line 20, in Claim 21, after "bridge" insert -- , --.

In column 8, line 26, in Claim 21, after "data" delete "oath" and insert -- path --, therefor.

Signed and Sealed this

Second Day of October, 2007

JON W. DUDAS
*Director of the United States Patent and Trademark Office*